July 12, 1960 P. D. IVANOFF 2,944,859

DEVICE FOR HOLDING INDIVIDUALLY IDENTIFIABLE DISCS

Filed May 22, 1956 2 Sheets-Sheet 1

INVENTOR.
PETER D. IVANOFF
BY Gregory S. Dolgorukov
ATTORNEY.

July 12, 1960 P. D. IVANOFF 2,944,859

DEVICE FOR HOLDING INDIVIDUALLY IDENTIFIABLE DISCS

Filed May 22, 1956 2 Sheets-Sheet 2

INVENTOR.
PETER D. IVANOFF
BY Gregory S. Dolgorukov
ATTORNEY.

2,944,859

DEVICE FOR HOLDING INDIVIDUALLY IDENTIFIABLE DISCS

Peter D. Ivanoff, 7749 Reuter, Dearborn, Mich.

Filed May 22, 1956, Ser. No. 586,475

1 Claim. (Cl. 312—15)

This invention relates to devices for holding in a catalogued order individually identifiable disc-like objects, such as phonograph decord discs, moving picture films in metal boxes, wound tape recordings, and the like.

Great difficulties and inconveniences have been experienced heretofore in holding or storing in a predetermined order individually identifiable disc-like objects of the above nature. Referring, for instance, to phonograph records, many people have collections of such records numbering in the hundreds. Obviously, records in such quantity should not be piled up on a shelf. Because of considerable weight, the lower records may be cracked in attempts to pull one of them out from under a pile of other records. Raising the pile at one side to facilitate withdrawal of such one record may also result in the top records slipping off and falling down. Rubbing of records in such storing is also very undesirable. The greatest inconvenience is confronted when a certain record has to be located. Unless the records are stored in some organized way, finding a desired record in a pile containing a large number of other records is time consuming, very annoying, and it takes out much pleasure from the enjoyment that one derives from possession of a collection of records.

At the present time the most common way of storing such records for more convenient use is to place them in a record book consisting of a number of envelopes open at the top and bound into a book. The middle portion of each envelope is provided with a recess exposing the label on the record. A record book of such a nature usually holds from five to twenty records and may cost several dollars. For convenient use such books have to be placed on a special shelf in some predetermined order and in a vertical position. This, in turn, requires provision of special shelves which are also relatively expensive.

However, even when such organization is produced with the aid of the above equipment, use of the record still presents considerable difficulties. In order to withdraw a certain desired record, the book containing the same must first be identified from a special catalog. Thereupon, the entire book must be taken out from the shelf and carried to a table or to some other place where it can be placed horizontally. Such operation presents the danger of the records falling out should, through a mistake, the book have been placed on the shelf upside down. Even if such a mistake was avoided, finding the record in a book usually requires turning the individual envelopes in the book like pages of a book until the proper record is found. Thereupon, the record disc must be withdrawn from the envelope and placed on the phonograph. While the record is being played, the book usually remains on the table in order to be available for return of the record. For returning the record, the same is inserted into its envelope in the book and the entire book carried back to the shelf. In other words, for playing a single record the entire book of records, which may weigh as much as ten pounds or even more, must be constantly handled and carried around, not only endangering all the records contained therein, but requiring exertion of considerable effort.

Motion picture films are usually stored in a horizontal position in stacks or piles, and the inconveniences explained above with respect to similar storing of record discs are not only present in storing in a catalogued order motion picture films but are greatly increased.

One of the objects of the present invention is to provide an improved device for holding in a catalogued order disc-like objects, whereby the above difficulties and disadvantages are overcome and largely eliminated, and any individual disc may be withdrawn for use and returned to its place quickly and easily, and with a minimum of handling.

Another object of the present invention is to provide an improved device of the foregoing nature with the use of which it is not necessary to handle or even to touch or disturb any other disc except the one which is desired to be used or played.

A further object of the present invention is to provide a device for holding individually identifiable disc-like objects, particularly phonograph records in a manner which prevents their grooved surfaces from rubbing against other records, walls, or any other surfaces.

A further object of the present invention is to provide a device for holding phonograph records which is susceptible of being made as a very attractive piece of furniture in which the desired mechanisms are completely concealed and only smooth outside surfaces are exposed to view when the device is not in use.

A still further object of the present invention is to provide a cabinet for phonograph records adapted to hold record discs of any desired size.

A still further object of the present invention is to provide an operating mechanism for withdrawing records, the mechanism, while being confined within a very narrow area approaching the thickness of the record, being operable easily and without interference with adjacent mechanisms.

A still further object of the present invention is to provide a device of the foregoing nature which is simple and rugged in construction, dependable in operation and relatively inexpensive to manufacture.

Further objects and advantages of this invention will be apparent from the following description and appended claim, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention, I provide a device adapted to hold each individual disc in a separate nest. The disc, when placed into a nest, is supported on a manually operable key which is, in effect, a beam supported at its middle and free to rock at such support between two positions. The disc can roll along the key from one end to the other over the fulcrum point. As the disc rolls over the fulcrum point, it moves the key from one position to the other. When the disc rolls rearwardly along the key and passes the fulcrum point, the rear end of the key moves down and the disc comes to and remains in its fully retracted position. When the key is pressed on its forward end, the disc rolls toward the front, passes the fulcrum point, and stops in its partly exposed position ready for withdrawal. The nests and the records are identified by the same character, usually a numeral. When the disc has to be returned to its place, by reading its number and finding the nest with the corresponding number, the disc is inserted into its corresponding nest and is pushed lightly to roll back into its fully retracted position. Thus, only the disc to be used is handled. While only a single cabinet is illustrated and described, it will be understood that a number of cabinets may be stacked up to form a case similar to a bookcase.

Referring specifically to the drawings, the device illustrated therein comprises generally a cabinet designated by the numeral 10 housing within itself the disc-holding unit generally designated by the numeral 11 and removable therefrom as a unit when the back wall 12 of the cabinet is taken out. Such a construction provides certain advantages such as having the disc-holding units manufactured separately for installation in cabinets of various finishes, as the orders require. It will be understood, however, that my improved device may also be constructed with the disc-holding partitions installed directly in the cabinet.

Figure 3:
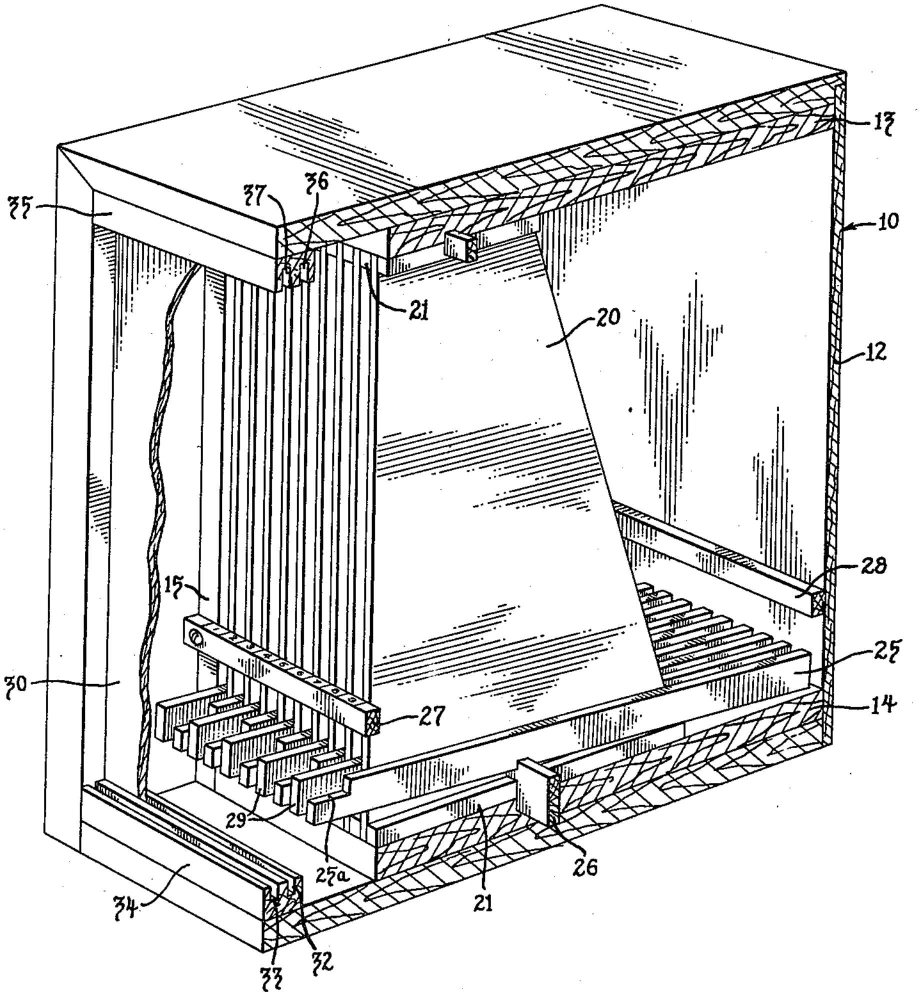
Fig. 3 is a perspective view of the device of Fig. 1 with portions of the device being broken away to expose its internal construction.

The disc-holding unit 11 comprises a top wall 13, a bottom 14 and end walls 15 (see Fig. 3). The front and the back of the unit 11 are open. The space within the disc unit 11 is divided into a plurality of nests by vertical partitions 20 separated from each other with the aid of spacers 21, the thickness of which is uniform and is selected in view of thickness of the discs. For phonograph records, spacers of 5⁄16" thick have been found satisfactory. To save material the partitions 20 need not extend all the way to the back of the device, and use of the shape as illustrated has been found advantageous.

At the bottom of each nest there is operatively mounted a key 25 supported intermediately of its ends on a fulcrum bar 26 passing through the entire length of the disc unit through all the nests thereof. The key 25 fits over the fulcrum bar at a slot provided in the key in order to prevent longitudinal movements of the key. The key 25 is supported at the fulcrum bar 26 at a certain distance from the bottom in order that the key 25 can rock at the fulcrum bar 26 assuming at the extremities of its rocking movement a rearwardly inclined position and a forwardly inclined position. It is of importance that the fulcrum point is spaced from the wall 12 at a distance greater than the radius of the largest disc expected to be placed in the nest. By virtue of such a construction, when the disc is rolled all the way rearwardly of the disc unit, it will overweigh the front of the key and will remain in its fully retracted position at the back of the unit. A stop bar 27 extending through the entire length of the disc unit is secured in front of the partitions 20. This bar operates to stop a record in its forwardmost position. It will be noted that the center of gravity C.G. of the disc in its forwardmost position as determined by the bar 27 is disposed in front of the fulcrum point 26, and, therefore, when the disc is in its forwardmost position, it overweighs the rear portion of the key 25 and remains in its forwardmost position. It will be noted that the forward extent of each partition is such that the disc in its forwardmost position protrudes for a considerable distance beyond the front of the nest and can be taken hold of with the fingers and removed from the nest by pulling it upwardly and forwardly.

Each nest is identified by a numeral placed preferably on the bar 27 in front of the nest as is best shown in Fig. 3. Each of the discs also bears a small label bearing the number or other identifying character identical with that of the nest allotted to it.

When a record disc numbered, say with the numeral 10, has to be returned to its place, the user holding the disc in a vertical position, inserts it over the stop bar 27 into the nest marked with the number 10, and pushes the disc slightly toward the rear of the cabinet in order to cause the disc to roll rearwardly of the nest on the key 25. As the disc rolls and its center C.G. passes the fulcrum point 24, the key 25 assumes a rearwardly inclined position, and the disc supported thereby continues to roll until it reaches its rearmost position designated in Fig. 2 by the numeral R*r*. Thereupon, unless the balance so established is disturbed by an extraneous force, the disc will remain in its R*r* position.

Figure 1:
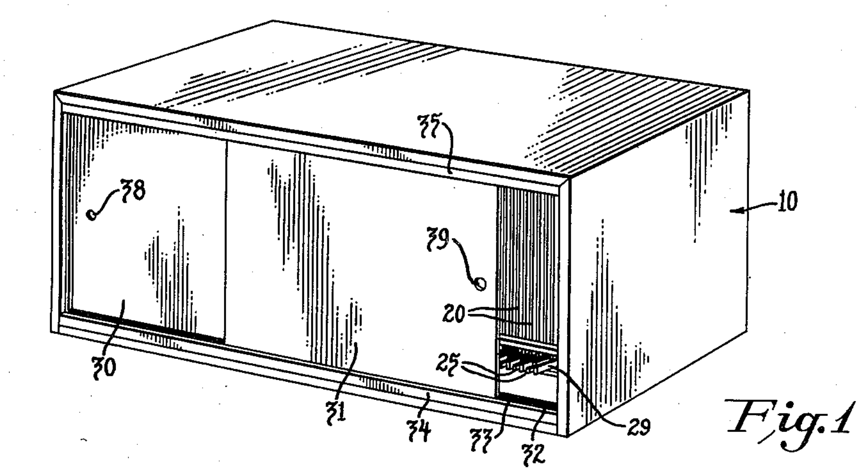
Fig. 1 is a perspective view showing a device for holding phonograph record discs and embodying the present invention.
Figure 2:
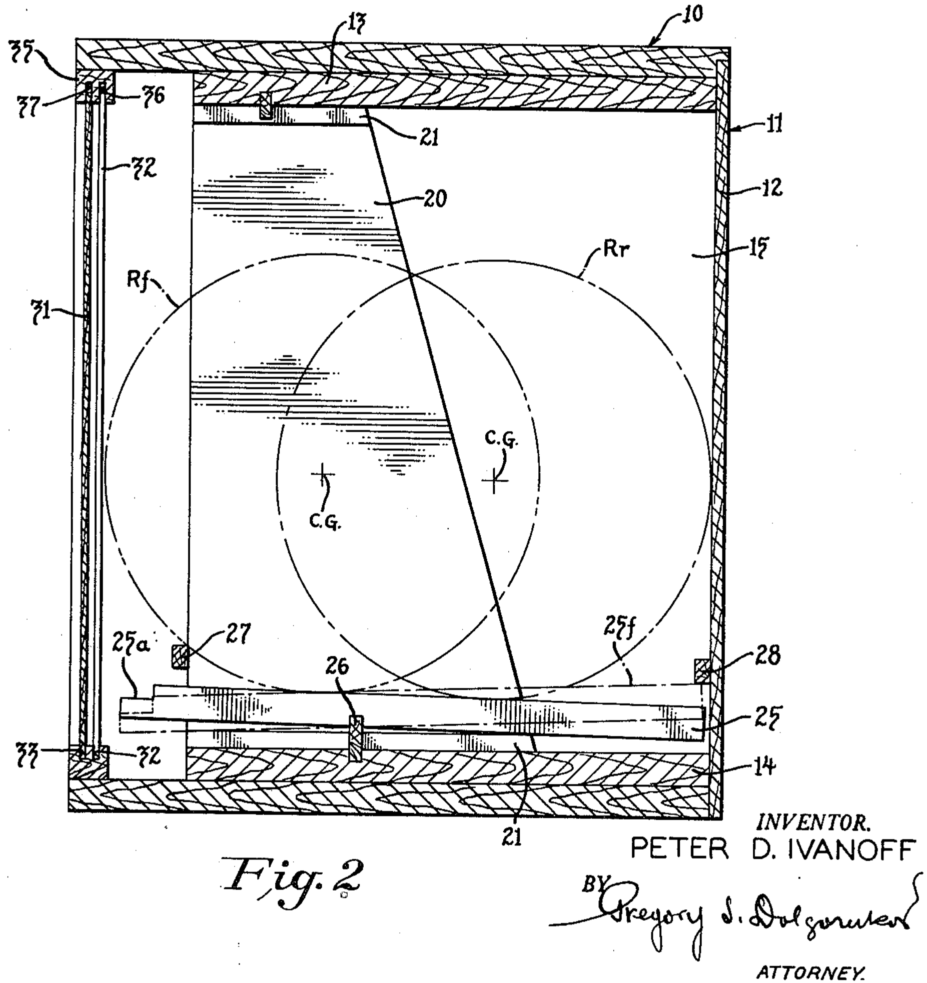
Fig. 2 is a transverse sectional view of the device of Fig. 1.

For withdrawal of the disc, the front end **25*a* of the key 25 is pushed down to bring the key 25 into its forwardly inclined position designated by 25*f*. The rear stop bar 28 limits the upward movement of the rear end of the key 25 as is best shown in Figs. 2 and 3. Because of the forwardly inclined position of the key 25**, the disc rolls forwardly from its position R*r* into its position R*f* and upon reaching the bar 27 stops and becomes ready for withdrawal.

It will be understood in view of the foregoing that a large number of discs may be housed or held within a relatively small cabinet. A cabinet holding one hundred units has been found particularly advantageous. The user prepares a catalog of his discs and labels them with catalog numbers which, in the example given, may run from 1 to 100. When the user wishes to withdraw a certain record, he finds the number of the record from the catalog, presses the key of that number and the disc comes to the front ready for withdrawal.

It will be noted that keys such as 25 are arranged very close to each other, and pressing the front end of such a key with the finger may be difficult. In order to eliminate such inconvenience, every alternate key is recessed at the front end thereof as shown at **25*a*. As a result of such a construction, the finger space for operating such recessed key is greatly increased. On the other hand, the non-recessed key such as key 29** has its front end extending upwardly beyond the front end of the recessed key and can be operated without interference from the adjacent keys.

The front of the cabinet is closed with two doors 30 and 31 sliding in slots 32 and 33, respectively, provided in the lower guide bar 34. The upper guide bar 35 has corresponding slots 36 and 37 which extend upwardly for a distance beyond the top edges of the doors 31 and 32, as is best shown in Fig. 2. By virtue of such a construction, the user can remove either or both of the sliding doors 30 and 31 by pushing them upward and taking the lower edge from the slot. The doors 30 and 31 are provided with finger holes 38 and 39, this expedient being advantageous since protruding handles may interfere with the operation of the doors.

By virtue of the above disclosed construction, the objects of the present invention and numerous additional advantages thereof are attained.

I claim:

A cabinet for record discs, said cabinet comprising an enclosure including a bottom, top, two rectangular side walls and a single vertical back wall; a plurality of vertical partitions provided parallel to said side walls and dividing the enclosure so formed into a plurality of nest compartments, said partitions being fixed both at their tops and bottoms and said compartments adapted fully to house the discs in the rolled-in position thereof; a rocking lever at the bottom of each of said compartments, each lever having two ends and adapted to support the disc placed therein and to provide a straight and smooth rolling track for the disc supported thereon, a fulcrum point provided for each lever intermediately of its ends and intermediately the centers of the discs in the rolled-in and the rolled-out positions of the discs, a fixed front stop bar for the discs immediately in front of said partition to determine the rolled-out position of the record discs and to provide a stop for the record discs in said position, the ends of said levers extending forwardly beyond said partitions to form manually operable keys; two parallel tracks provided along the front edges of said bottom and said top and in the plane beyond the furthest extent of said keys as well as of the discs in the rolled-out position thereof, two rigid cover panels slidably arranged in said tracks to slide in vertical planes and adapted in their fully extended position to close completely the front of said cabinet, including said compartments, the keys and the record discs, including those discs that may be in their rolled-out position, and to open any one of said compartments when slid past the other panel, said front stop bar for the discs also serving as a base for an identification marking of the compartments, with the front ends of each second lever being recessed, and a back stop bar provided on the front of the back wall to serve as a stop for the levers.

References Cited in the file of this patent

UNITED STATES PATENTS

| | | |
|---|---|---|
| 798,028 | Farrell | Aug. 22, 1905 |
| 1,525,033 | Haag | Feb. 3, 1925 |
| 1,565,993 | Fitzpatrick | Dec. 15, 1925 |
| 2,226,779 | Roads | Dec. 31, 1940 |
| 2,463,238 | Bissell | Mar. 1, 1949 |

FOREIGN PATENTS

| | | |
|---|---|---|
| 65,611 | Denmark | Aug. 25, 1947 |